United States Patent [19]

Akeson et al.

[11] 4,015,488
[45] Apr. 5, 1977

[54] DIGITAL ELECTRONIC CONTROLLER FOR POWER TRANSMISSION

[75] Inventors: Richard C. Akeson, Brookfield; Robert W. Hockenbury, Milwaukee, both of Wis.

[73] Assignee: Twin Disc, Incorporated, Racine, Wis.

[22] Filed: Sept. 29, 1975

[21] Appl. No.: 617,429

[52] U.S. Cl. .............................................. 74/866
[51] Int. Cl.² ....................................... B60K 41/06
[58] Field of Search ................. 74/866, 867, 869

[56] References Cited
UNITED STATES PATENTS

| | | | |
|---|---|---|---|
| 3,702,572 | 11/1972 | Wakamatsu et al. | 74/866 |
| 3,805,640 | 4/1974 | Schneider et al. | 74/866 |

*Primary Examiner*—Samuel Scott
*Assistant Examiner*—Wesley S. Ratliff, Jr.
*Attorney, Agent, or Firm*—James E. Nilles

[57] ABSTRACT

A power transmission system includes an engine-driven lockup type torque converter for driving a gear shift mechanism shiftable to different speed ranges by solenoid operated clutch valves. A digital electronic controller provides output signals to operate the solenoids of the clutch valves. The controller receives input signals from a manually operable multiposition electric shift range selector switch; from an output speed sensor on the gear shift mechanism; and from an engine throttle position (on-off) switch.

The controller comprises a counter circuit regulated by a system clock, for receiving amplified and shaped pulses from the speed sensor and for providing a counter signal related to gear shift mechanism output speed. The counter signals from the counter are presented to a speed matrix and signal pattern recognition circuits connected to the matrix ascertain whether certain speeds are reached. A shift logic circuit receives signals from the recognition circuits, from the range selector switch and from the throttle position switch and provides appropriate output signals to an up/down counter which in turn operates a decoder to provide control signals for operating solenoid driver circuits for the solenoids of the clutch valves.

4 Claims, 6 Drawing Figures

DIGITAL ELECTRONIC CONTROLLER FOR POWER TRANSMISSION

BACKGROUND OF THE INVENTION

1. Field of Use

The present invention relates generally to a digital electronic controller for operating a power transmission which includes an engine-driven torque converter connected to a speed changing gear shift mechanism for transmitting power to, for example, the wheels of the vehicle, such as off-highway earth-moving machines in the 200 to 750 horsepower class.

2. Description of the Prior Art.

U.S. Pat. No. 3,805,640 issued Apr. 23, 1974, to Schneider et al for "Electronically Controlled Power Transmission" and assigned to the same assignee as the present application, discloses an engine-driven torque converter for driving a speed changing gear shift mechanism which transmits power to vehcile wheels. The torgue converter is provided with a lock-up clutch for connecting the torque converter into direct drive when engine speed is sufficiently high. Shifting in or out of clutch lock-up is controlled by a lock-up clutch valve which in turn is responsive to pressure conditions in a control valve on the gear shift mechanism. However, operation of the lock-up clutch valve can be inhibited by operation of a lock-up clutch solenoid valve. The gear shift mechanism is provided with sets of gears for different speed ranges and with clutches which are selectively operable to shift the mechanism into different speed ranges. These clutches are operated by solenoid controlled clutch valves. The torque converter is also provided with a solenoid operated retarder valve which automatically engages to effect retardation of the speed of the gear shift mechanism when the torque converter is direct drive and torque converter turbine speed exceeds engine high-idle speed. The retarder disengages after the lock-up clutch is signalled to disengage.

U.S. Pat. No. 3,805,640 discloses an analog type electronic controller which provides electrical output signals for actuation or non-actuation of the lock-up clutch solenoid valve, for actuation of the solenoids of the gear shift mechanism solenoid operated clutch valves and for actuation of the solenoid for the solenoid operated retarder valve. The prior art electronic controller receives electric input signals from a manually operable multiposition electric shift range selector switch; from an output speed sensor on the gear shift mechanism; from a turbine speed sensor on the torque converter (to effect retarder operation); and from an engine throttle position switch.

A transmission in accordance with U.S. Pat. No. 3,805,640 is capable of the following functions: automatic upshift or downshift to the selected speed range; automatic shifting to maintain appropriate speed in view of the speed range selected; automatic time delay in each speed range when upshifting or downshifting to speed ranges other than the next range to prevent hunting; downshifting or shift to neutral only when the correct speed range is reached; prevents any shifting to neutral unless that position is actually selected; prevents a shift reversal until a predetermined low speed is reached; inhibits lock-up in certain speed ranges; and performs other control functions.

The principle advantages of such a transmission are that it requires less skill on the part of the operator; it provides greater operating efficiency in that correct speed ranges are automatically selected and maintained; it reduces the possibility of damage to the transmission die to the use of incorrect operation procedures; and it increases the operating life of all transmission components due to the face that they operate within correct desired speed ranges and design limits.

SUMMARY OF THE INVENTION

FIG. 1 shows that a transmission system in accordance with the present invention comprises a torque converter driven by an engine or prime mover for driving a speed changing gear shift mechanism which transmits power to vehicle wheels through an ouput shaft and a final drive. Engine is accelerated or decelerated in response to operation of an accelerator pedal. The torque converter is provided with a lock-up clutch for connecting the torque converter for direct drive when the speed of engine is sufficiently high. Shifting in or out of clutch lock-up is controlled by lock-up clutch valve which effects operation of a lock-up clutch actuator in response to fluid pressure conditions in a pitot device connected to the gear shift mechanism. The gear shift mechanism in understood to be provided with sets of gears (not shown) for enabling operation in neutral, forward, or reverse, and first through sixth shift ranges, and with clutches (not shown) which are selectively operable to shift the mechanism into the specified shift ranges by means of eight solenoid operated clutch valves.

As FIGS. 1 and 2 show, a digital electronic controller furnishes electrical control signals for actuation of the solenoids of the solenoid operated clutch valves to thereby operate shift mechanism. The controller receives input signals from three sources, namely: a range signal from a manually operable multiposition shift range selector switch; a pulsed speed signal from an output speed pickup or sensor on the gear shift mechanism; and an acceleration signal (on-off) from an engine throttle position sensing means or on-off switch. The switch closes when the accelerator pedal is depressed for acceleration and opens when the pedal is released for deceleration. U.S. Pat. No. 3,805,640 hereinbefore referred to discloses a shift mechanism, solenoid operated clutch valve, a selector switch, and a speed pickup sensor generally similar to those specified herein.

Referring to FIG. 2, the controller is provided with a source of electric power, such as 24 volt battery, which energizes a power supply circuit (see FIG. 5). A speed pulse signal from the output speed pickup (see FIG. 3) on the mechanism is applied to the controller wherein it is amplified and shaped by an amplifier and waveshaper circuit (see FIG. 3) and then fed to a counter circuit (see FIGS. 3 and 4). A supervisory circuit (see FIG. 3) is provided to sense the continuity of the speed pulse signal circuit and operates to shut down the controller rather than cause a false output in the event the output speed pickup circuit develops a fault. The counter circuit is periodically reset by a system clock circuit (FIG. 4), and prior to being reset, the counter circuit provides some numerical count signal corresponding to the number of pulses being received from circuit. The system clock circuit resets the counter circuit every half second so that two readings are taken per second. The counter circuit is connected to a speed matrix circuit (see FIG. 3) which comprises a series of diodes connected in a speed matrix. Matrix is connected to and operates signal pattern recognition circuits which are programmed to recognize a particular signal pattern from the counter circuit. The recognition circuits are divided into a downshift section and an upshift section. The presence of a particular signal pattern at speed matrix means that a particular count signal, corresponding to the speed point that is being monitored, has been achieved. For example, if a predetermined count signal is presented, it means that a certain transmission (vehicle) speed has been reached. Failure to present this predetermined count signal means failure to reach that certain speed. Shifting signals are provided by a shift logic circuit (see FIGS. 4 and 6) on the basis of receiving or not receiving the programmed count signals from the recognition circuits which correspond to transmission output speeds. The shift logic circuit is connected to receive range signals from a shift range selector circuit (see FIG. 6), which is connected to range selector switch, and takes into account the highest gear range selected so that, if the speed for a particular gear range is being exceeded, if that is the highest gear range selected hy the operator by means of the shift range selector, there will be no upshift signal and no shift up to the next higher transmission speed range. The shift logic circuit is also connected to receive on-off signals (acceleration - deceleration) from the throttle position sensing switch so that, if the speed for the selected gear range is exceeded, there will not be an upshift signal if the accelerator is not being depressed and the throttle position switch is off (open). Only if the accelerator is depressed and the throttle position switch is on (closed) will there be an upshift signal. The shift logic circuit feeds an appropriate signal to an up/down counter circuit (see FIG. 4) which counts signals to determine which gear range should be employed. The output signal of the up/down counter is fed to a decoder circuit (see FIG. 4) which provides a control signal which operates the solenoid driver circuit (see FIG. 5) for the solenoids of the solenoid valves shown in FIG. 1 for the automatic gear shift mechanism. The solenoid drivers for the manual ranges, namely, neutral, reverse and first, are not fed from the decoder but are fed separately, as hereinafter explained. The output from the decoder is fed directly to the solenoid drivers for the second through sixth gear ranges. The solenoid driver transistors (see FIG. 5) are protected by a protection circuit (see FIG. 6) which removes all power from the controller in the case of excess current.

The prior art electronic analog controller in accordance with U.S. Pat. No. 3,805,640 is an analog system and converted the pulse frequency signals applied thereto from the various inputs to a voltage corresponding to speeds and then sensed those voltages to determine whether or not the speeds were at, above, or below a reference point and then proceeded to effect necessary control functions. In accordance with the present invention, the controller circuit is completely digital and samples two readings per second of the vehicle speed and provides an actual count of the pulses generated by the pulse generator.

A digital controller in accordance with the present invention is able to achieve substantially the same end result as that of U.S. Pat. No. 3,805,640 at less cost and is more stable, in that the set points for the shift ranges do not shift or drift. The present digital control is designed and constructed to effect and operate on an exact count of input signals, and zero error, and effects shifting from one speed or another on the basis of an exact count of input signals. Temperature, vibration, and humidity do not substantially affect shift point accuracy.

DESCRIPTION OF A PREFERRED EMBODIMENT

General Arrangement and Operation

Figure 1:
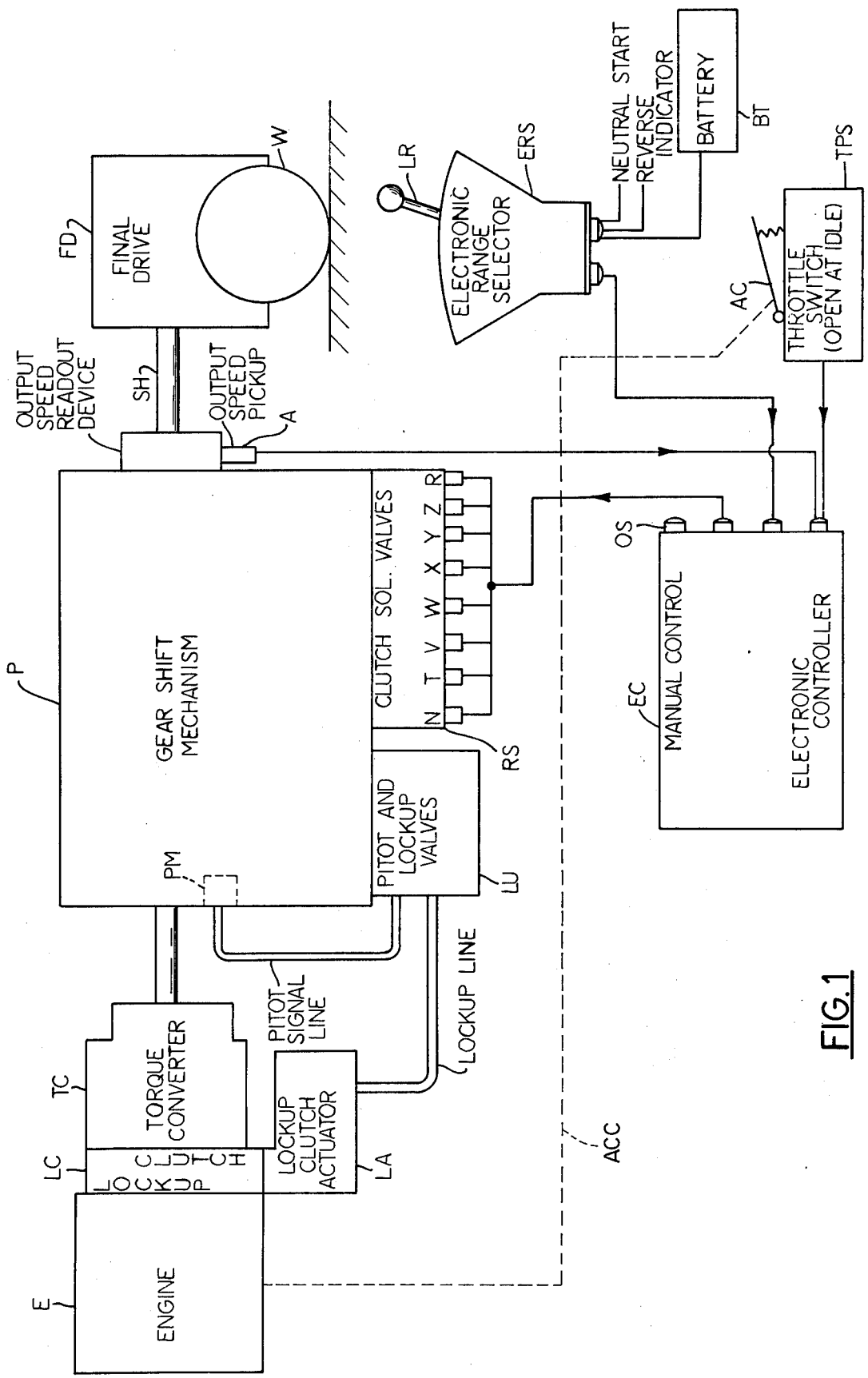
FIG. 1 is a schematic diagram of a transmission system in accordance with the present invention.

FIG. 1 shows that a transmission system in accordance with the present invention comprises a torque converter TC driven by an engine or prime mover E for driving a speed changing gear shift mechanism P which transmits power to vehicle wheels W through an output shaft SH and a final drive FD. Engine E is accelerated or decelerated in response to operation of an accelerator pedal AC, as indicated by line ACC in FIG. 1. The torque converter TC is provided with a lock-up clutch LC for connecting the torque converter for direct drive when the speed of engine E is sufficiently high. Shifting in or out of clutch lockup is controlled by a lock-up clutch valve LU which effects operation of a lock-up clutch actuator LA in response to fluid pressure conditions in a pitot device PM connected to the gear shift mechanism P. The gear shift mechanism P is understood to be provided with sets of gears (not shown) for enabling operation in neutral, forward, or reverse, and first through sixth shift ranges, and with clutches (not shown) which are selectively operable to shift the mechanism into the specified shift ranges by means of eight solenoid operated clutch valves designated N, R, T, W, X, Y and Z. respectively.

Figure 2:
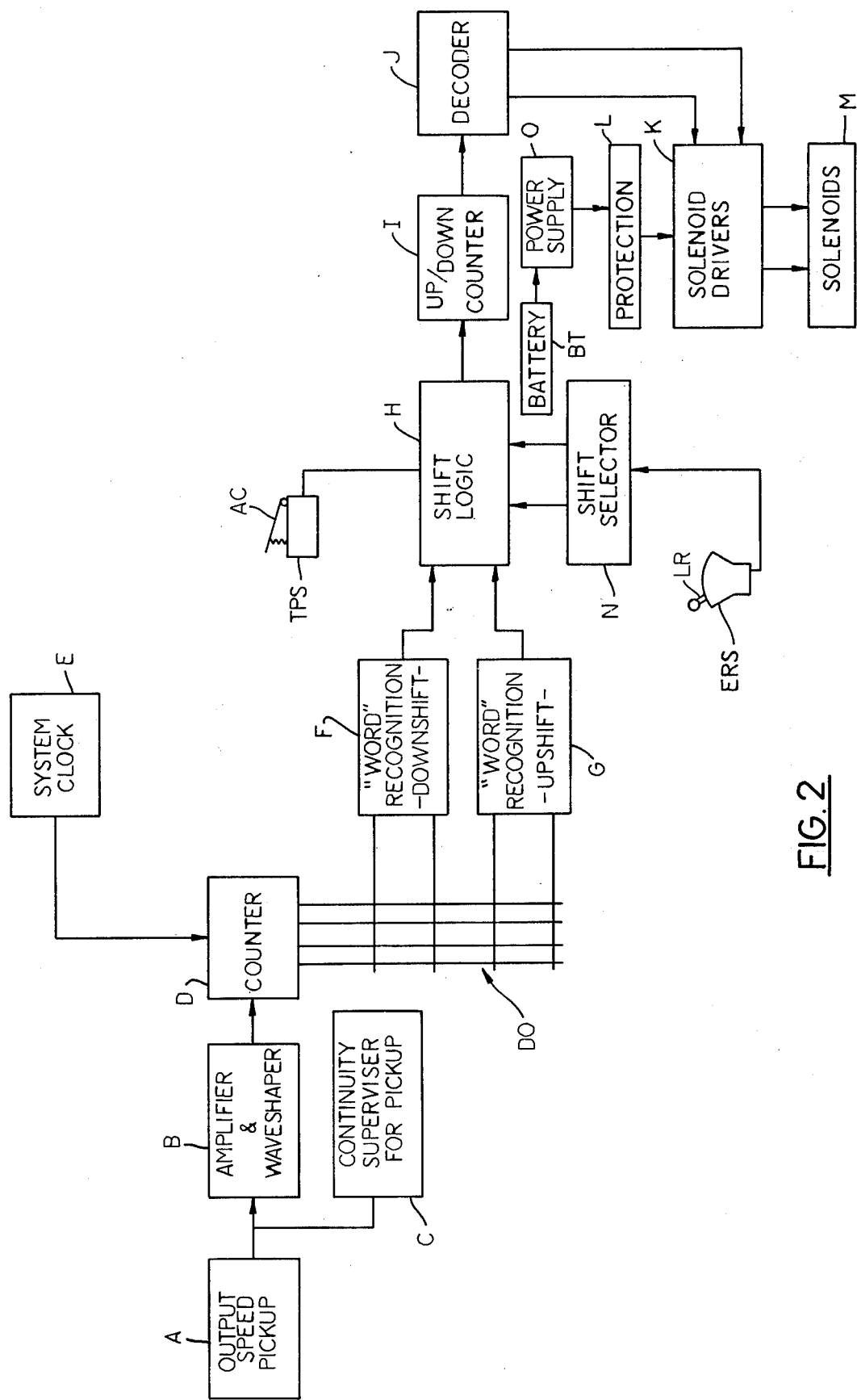
FIG. 2 is a schematic diagram of the digital electronic controller for the transmission system shown in FIG. 1.

As FIGS. 1 and 2 show, a digital electronic controller EC furnishes electrical control signals for actuation of the solenoids of the solenoid operated clutch valves to thereby operate shift mechanism P. The controller EC receives input signals from three sources, namely: a range signal from a manually operable multiposition shift range selector switch ERS; a pulsed speed signal from an output speed pickup or sensor A on the gear shift mechanism P; and an acceleration signal (on-off) from an engine throttle position sensing means or on-off switch TPS. Switch TPS closes when the accelerator pedal AC is depressed for acceleration and opens when the pedal AC is released for deceleration. U.S. Pat. No. 3,805,640 hereinbefore referred to discloses a shift mechanism, solenoid operated clutch valve, a selector switch, and a speed pickup sensor generally similar to those specified herein.

Figure 4:
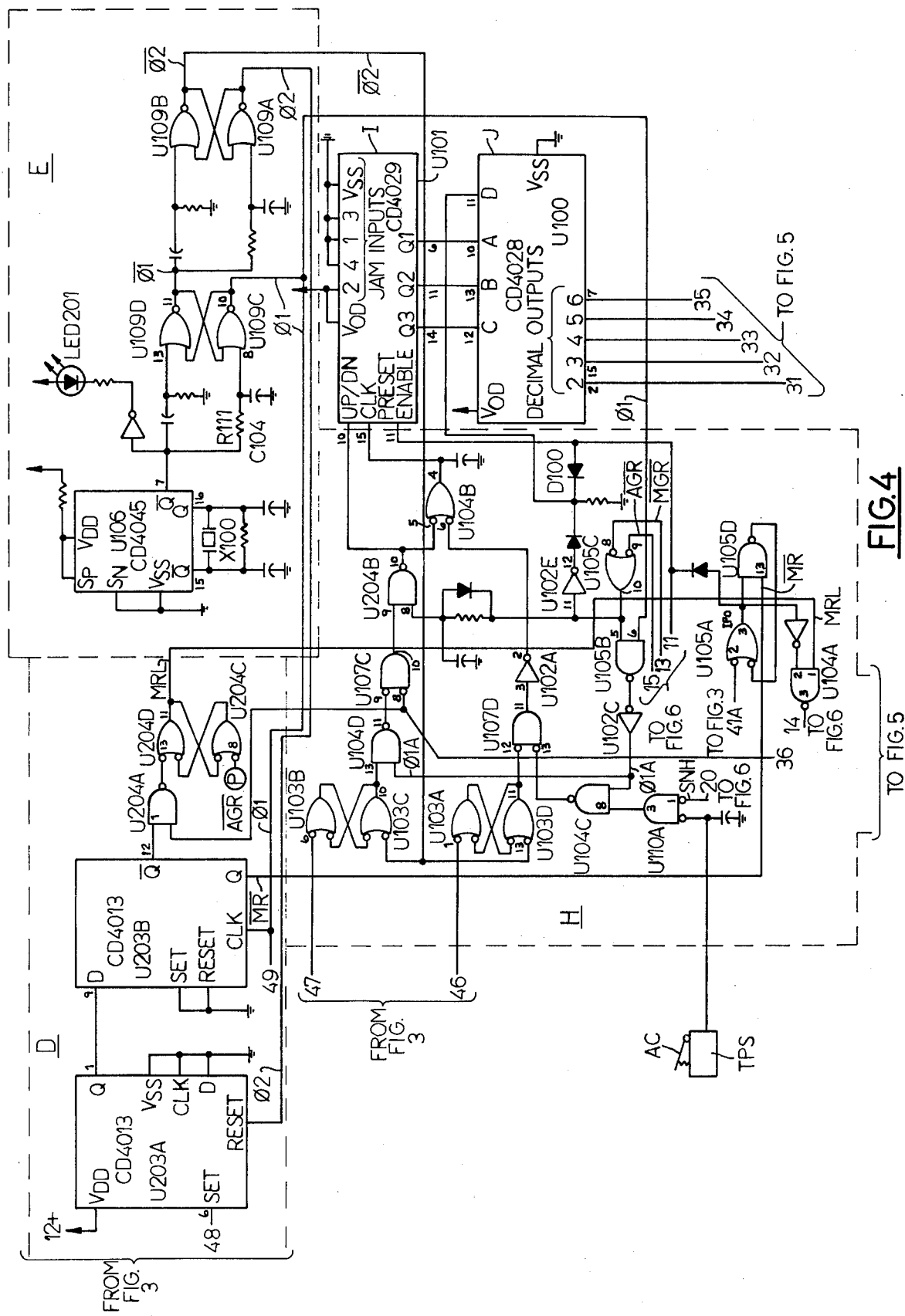
Figure 5:
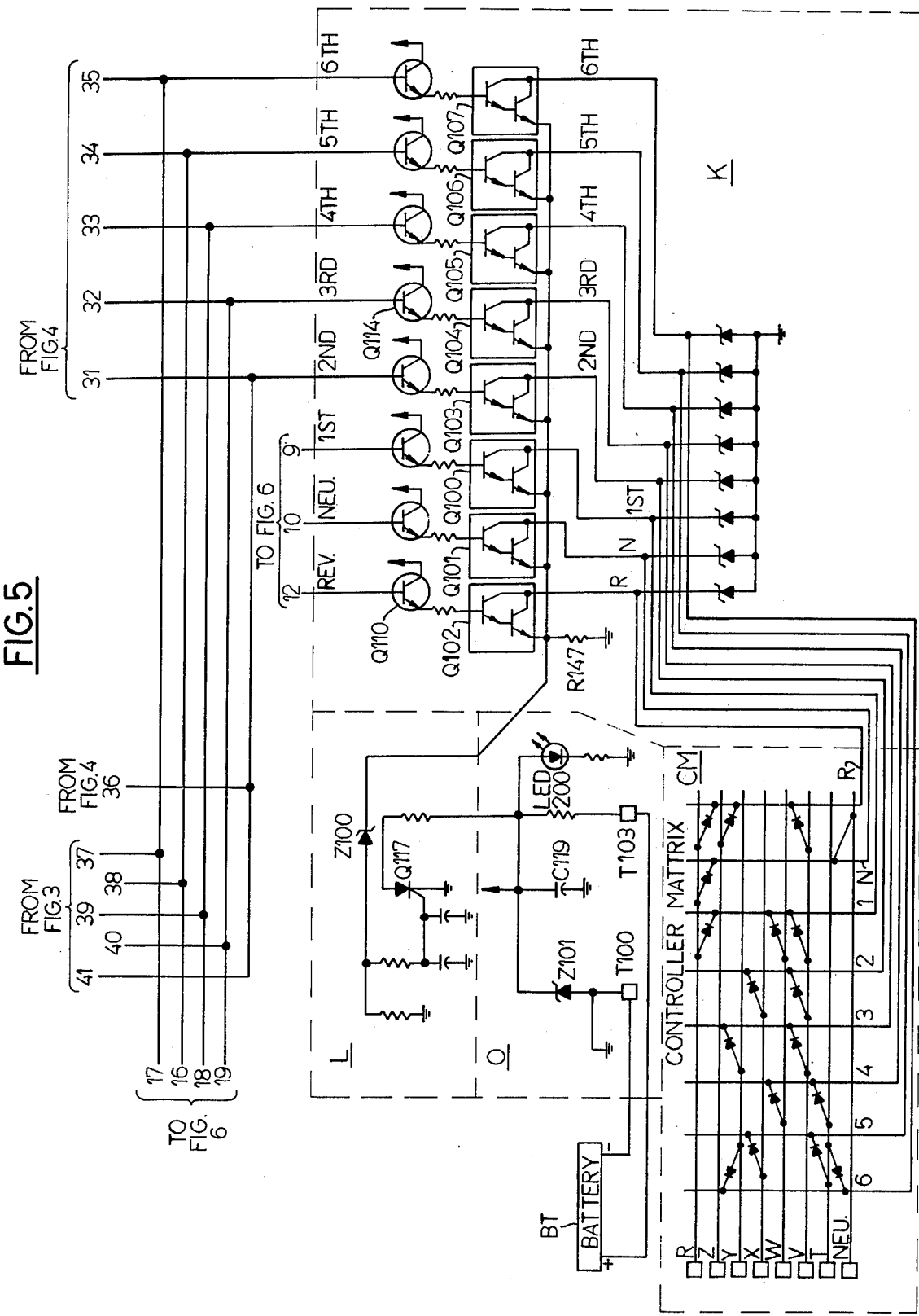

Referring to FIG. 2, the controller EC is provided with a source of electric power, such as a 24 volt battery BT, which energizes a power supply circuit O (see FIG. 5). A speed pulse signal from the output speed pickup A (see FIG. 3) on the mechanism P is applied to the controller EC wherein it is amplified and shaped by an amplifier and waveshaper circuit B (see FIG. 3) and then fed to a counter circuit D (see FIGS. 3 and 4). A supervisory circuit C (see FIG. 3) is provided to sense the continutity of the speed pulse circuit A and operates to shut down the controller EC rather than cause a false output in the event the output speed pickup circuit A develops a fault. The counter circuit D is periodically reset by a system clock circuit E (FIG. 4), and prior to being reset, the counter circuit D provides some numerical count signal corresponding to the number of pulses being received from circuit B. The system clock circuit E resets the counter circuit D every half second so that two readings are taken per second. The counter circuit D is connected to a speed matrix circuit DO (see FIG. 3) which comprises a series of diodes connected in a speed matrix. Matrix DO is connected to and operates signal pattern recognition circuits F and G which are programmed to recognize a particular signal pattern form the counter circuit D. The recognition circuits are divided into a downshift section F and an upshift section G. The presence of a particular signal pattern at speed matrix DO means that a particular count signal, corresponding to the speed point that is being monitored, has been achieved. For example, if a predetermined count signal is presented, it means that a certain transmission (vehicle) speed has been reached. Failure to present this predetermined count signal means failure to reach that certain speed. Shifting signals are provided by a shift logic circuit H (see FIGS. 4 and 6) on the basis of receiving or not receiving the programmed count signals from the recognition circuits F and G which correspond to transmission output speeds. The shift logic circuit H is connected to receive range signals from a shift range selector circuit N (see FIG. 6), which is connected to range selector switch ERS, and takes into account the highest gear range selected so that, if the speed for a particular gear range is being exceeded, if that is the highest gear range selected by the operator by means of the shift range selector ERS, there will be no upshift signal and no shift up to the next higher transmission speed range. The shift logic circuit H is also connected to receive on-off signals (acceleration - deceleration) from the throttle position sensing switch TPS so that, if the speed for the selected gear range is exceeded, there will not be an upshift signal if the accelerator AC is not being depressed and the throttle position switch TPS is off (open). Only if the accelerator AC is depressed and the throttle position switch TPS is on (closed) will there be an upshift signal. The shift logic circuit H feeds an appropriate signal to an up/down counter circuit I (see FIG. 4) which counts signals up or down to determine which gear range should be employed. The output signal of the up/down counter I is fed to a decoder circuit J (see FIG. 4) which provides a control signal which operates the solenoid driver circuit K (see FIG. 5) which actuates the matrix CM to provide operating signals for the solenoids M of the solenoid valves shown in FIG. 1 for the automatic gear shift mechanism P. The solenoid drivers for the manual ranges, namely, neutral, reverse and first, are not fed from the decorer J but are fed separately, as hereinafter explained. The output from the decoder J is fed directly to the solenoid drivers for the second through sixth gear ranges. The solenoid driver transistors Q108 through Q115 (see FIG. 5) are protected by a protection circuit L (see FIG. 6) which removes all power from the controller EC in the case of excess current.

General Operation

The following is a general description of a transmission system employing a controller EC in accordance with the invention. Assume that engine E is running, that the accelerator AC is not depressed and that the switch TPS is open, and that the range selector switch ERS is in neutral. Under such an assumption, the gear shift mechanism P is in neutral.

Now assume that the operator moves the handle LR of the selector switch ERS to fourth gear position and that he depresses accelerator AC to accelerate engine E and effect closure of switch TPS. The vehicle will begin to move and its speed will increase thereby causing an increase in the frequency of the output signals from output speed pickup A. The signal from speed pickup A is transferred to counter D to efffect operation of the rest of the controller circuitry. Movement of the lever LR in range selector ERS from neutral to first gear foward position manually effects shifting from neutral to first gear forward by directly effecting actuation of the appropriate solenoids. Similarly, movement of the lever LR from first gear forward to second gear forward manually effects operation of the appropriate solenoids causing shifting into second gear. However, shifting from second gear to third gear and from third gear to fourth gear will occur automatically due to the appearance of an output signal on line 46 shown in FIGS. 3 and 4. Once fourth gear is reached, gate U107D in FIG. 4 will set the circuitry so that there will be no automatic shift to a higher gear range, regardless of engine speed, unless the operator, himself, moves the lever LR of selector switch ERS into some other higher gear range.

Assuming operation in fourth gear, if the operator moves the lever LR of selector switch ERS from fourth gear down to a lower gear there will not be an automatic shift from fourth gear to third gear or from third gear to second gear until the appropriate speed is reached and recognized by counter circuit D. Downshifting from second gear to first gear or from first gear to neutral is a manual function carried out by manual actuation of the appropriate solenoid.

It should be noted that when the vehicle operator is accelerating engine E by depression of accelerator pedal AC, the switch TPS is closed thereby providing a signal to gate U107D indicating that an upshift is permissible to a selected speed range. However, if the accelerator pedal AC is not depressed and switch TPS is open gate U107D will inhibit any upshift regardless of the speed range selected. It is to be further noted that gate U107D, while inhibiting any upshifting, will not prevent a downshift since downshifting is controlled by a different set of gates.

It should also be noted that whether accelerator switch TPS is open or closed will have no effect on shifting operations in the manual range, namely, neutral, first and reverse. Automatic operation of the system occurs only in the speed ranges second through sixth.

Pulse Input Circuits

Figure 3:
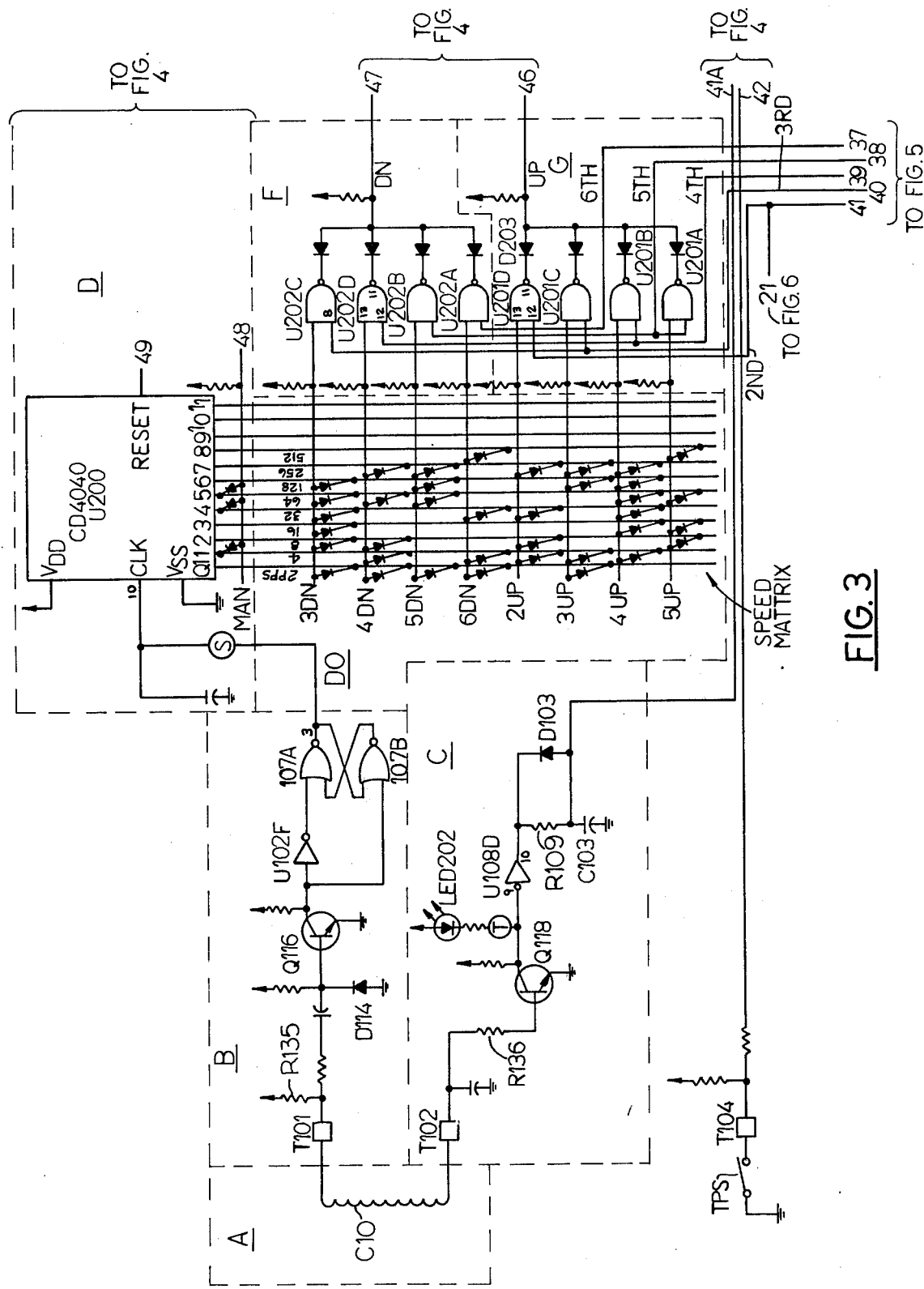
FIGS. 3, 4, 5, and 6 are electric circuit diagrams of the components of the digital electronic controller shown schematically in FIG. 2.

Referring to FIG. 3, circuit B amplifies and shapes the incoming pulses from the coil C10 of the magnetic sensor or pickup A. Circuit C supervises the pickup A for shorts. The input pulses to circuits B and C from coil C10 in circuit A come in through terminals T101 and T102, respectively. Transistor Q118 in circuit C is turned "ON" by resistors R135 and R136 allowing light emitting diode LED200 to conduct, indicating that the magnetic pickup A is conducting. When trasistor Q118 if "ON", pin 9 of inverter gate U108D is low making pin 10 of gate U108D high to line 41A for the initial power on circuit IPO (see FIG. 4) allowing the counter circuit I, which comprises an integrated circuit device U101 (see FIG. 4) to count. If the magnetic pickup A is shorted to ground, then transistor Q118 will turn "OFF", pin 9 of gate U108D goes high causing pin 10 of gate U108D to go low to circuit IPO, which prevents counter circuit I from counting. Transistor Q116 in circuit B is used to amplify the incoming pulses while diode D114 clips the negative going pulses.

From transistor Q116 the pulses go to the pulse shaping circuit (FIG. 3) which comprises gate U102F, and gates U107B. These gates form a flip-flop which toggles high and low with the incoming pulses. The output at pin 3 of gate U107A is sent to pin 10 of integrated circuit counter device U200 of counter circuit D which is the speed counter. The flip-flop comprising gates U107A and U107B also provides a clean square wave output with sharp rising and falling edges which are essential for a good clocking waveform.

If an open circuit were to occur on the pick-up circuit A, the circuit B would not sense any speed and the controller EC would begin downshifting to second gear, if in the automatic mode.

Power Supply

Referring to FIG. 5, the internal power supply O for controller EC comprises a zener diode Z101 for voltage regulation, with a filter capacitor C119. External battery power at 24 volts is applied to input terminals T100 (negative) and T103 (positive) from battery BT and is regulated to 12 volts DC. Light emitting diode LED200 provides an indication of power being on. Diode LED200 will not light, if the power leads are reversed or if there is discontinuity in the power cable.

Overcurrent Protection

Referring to FIG. 5 showing circuits K and L, the solenoid driver transistors Q100 through Q107 have overcurrent protection from the solenoids they drive. Resistor R147 is used to sense current on the emitters of each of the aforementioned transistors. For example, a current range of 2.9 amps to 3.9 amps is the trigger range for the circuitry. When a solenoid draws current in the trigger range, resistor R147 sends a voltage signal to zener diode Z100 in protection circuit L. Zener diode Z100 will break down at 2.8 volts, ±5%, and provide at least 0.6 volts to the gate of controlled rectifier SCR Q117. When controlled rectifier SCR Q117 is fired, it will pull the power bus towards ground and thereby not provide enough voltage to power the controller EC. The restoration of power will only occur when the power input is removed momentarily and then replaced.

Internal System Clock

Referring to FIG. 4, system clock circuit E provides two-phase clock output signals, in the lines designated $\phi 1$ and $\phi 2$, which is used to generate the timing for shifting and reset pulses to the associated circuitry. Both output signals in lines $\phi 1$ and $\phi 2$ have a time period, for example, of 500ms but the signal in line $\phi 2$ is delayed 0.6ms from the signal in line $\phi 1$. The delay is used so that the shifting sequences can occur fully before output signal in line $\phi 2$ resets its associated counters and flip-flops.

A crystal X100 oscillating at 4.19MHZ to provide a frequency which goes to pins 15 and 16 of integrated circuit divider device U106, where it is divided down to 2HZ. A light emitting diode LED201 is used as an indicator to show that the system clock E is running. The 2HZ signal from pin 7 of device U106 goes to pin 13 of gate U109D. The positive transition of the 2HZ signal will set the gates U109C and U109D comprising a flip-flop thereby making pin 11 of gate U109D low and pin 10 of gate U109C high. At the same time, capacitor C104 is charged through resistor R111 until pin 8 of gate U109C is high enough to cause resetting the gates U109C and U108D of the flip-flop making pin 11 high and pin 10 low. This same sequence will occur for the gates U109A and U109B of the flip-flop generating the line $\phi 2$ clock signal waveform.

The line $\phi 1$ pulses go directly to counter device U200 in counter circuit D (see FIGS. 3 and 4) to reset it, but are modified before reaching the gates U107C and U104D of logic circuit H in FIG. 4 that control upshifting and downshifting. The output signal in line $\phi 1$ from pin 10 of gate U109C goes to pin 6 of gate U105B. Gate U105C is used to sense that the shift selector ERS is in a defined position. If the selector ERS is in either the $\overline{\text{AGR}}$ or $\overline{\text{MGR}}$ position, pin 9 or pin 8 of gate U105C will be low which will make pin 10 of gate U105C high, to pin 5 of gate U105B. Under these circumstances, the automatic gear range (AGR) is Not and the manual gear range (MGR) is Not. The $\overline{\text{AGR}}$ signal is generated by diodes D104, D108, D111, and D113, (see FIG. 6) to the $\overline{\text{AGR}}$ bus line. The $\overline{\text{MGR}}$ signal is generated through diodes D120 through D122 (see FIG. 6) to the $\overline{\text{MGR}}$ bus. As long as pin 5 remains high, a signal in line $\phi 1A$ will be generated for the upshift and downshift logic. The signal in line $\phi 1A$ is the signal in line $\phi 1$ modified as described and is the main pulse signal used to generate shift commands.

Any time that the shifter ERS is in an undefined position, pin 10 of gate U105C will go low inhibiting line $\phi 1$ pulses from passing gate U105B and also will put a low on pin of gate U102E. Pin 12 of gate U102E will go high to pin 11 of gate U100 via diode D101. This high will cause an unused output of gate U100 to be commanded, thereby blocking any commands to the solenoid drivers. Under these circumstances, the automatic gear range (AGR) is Not and the manual gear range (MGR) is Not.

Initial Power On Circuit (IPO)

Referring FIG. 4, the initial power on circuit IPO is used to give the flip-flop and counters a chance to reset and set when the vehicle ignition is initially turned on. It also will shut down the controller EC if power is lost or if a problem occurs with the magnetic speed sensor A.

The flip-flop comprising gates U105A and U105D is used to generate the IPO signal. A low on pin 2 of U105S will set the flip-flop making pin 3 high, or a low on pin 13 of U105D will reset the flip-flop making pin 3 low.

When power is first applied, transistor Q118 (FIG. 3) will turn "ON" and will make pin 9 of gate U108D low causing pin 10 of gate U108D to be high. Since diode D103 will block this high, the only path it has is to charge capacitor C103 through resistor R109 causing a delay when power is initially turned on. When the voltage on capacitor C103 reaches approximately 0.7 of system voltage, pin 2 of gate U105A will go high, thus enabling the gates U105A and U105D of the flip-flop circuit. When the manual speed range is reached, pin 13 of gate U203B will go low to pin 13 of gate U105D resetting the flip-flop. When the flip-flop is reset, pin 3 of gate U105A will be low to gates U100 and U101 allowing shift commands to be generated.

Any time there is an interruption of power on the line or the speed sensor A becomes grounded, transistor Q118 will turn "OFF" causing pin 9 of gate U108D to go high. This will make pin 10 of gate U108D low through diode D103 to pin 2 of gate U105A. Pin 3 of gate U105A will then go high to pin 1 of gate U101 and pin 11 of gate U100 which will drop the gear commanded and generate a command for an unused output. At this time, a latch plate (not shown) in the transmission mechanism P will take over and hold the vehicle in the last gear commanded until the controller EC is reset. If a momentary interruption of power was the cause, the vehicle must be slowed down to the manual speed range before the controller EC can be restored to normal operation. If a problem with the speed sensor A is the cause of shut-down, it must be cleared first before the controller EC will be restored to normal operation.

Speed Counter and Speed Programming Matrix

Referring to FIG. 3, a type CD4040 integrated circuit counter designated U200 is used to sense the incoming speed pulses. The counter U200 is a 12 stage counter with each of its outputs fed to the speed matrix DO shown in FIG. 3. The speed matrix DO has 108 points to select the shift speeds. At each point a pair of split terminals in series with a diode is provided so a jumper wire may be soldered in place to select a particular speed. The speed matrix is divided into three groups, the upshift points the downshift points and the manual speed points, namely, first, reverse, and neutral.

The speed pulses from pin 3 of gate U107A (see FIG. 3) are fed to pin 10 of counter U200 which is the clock input. The counter U200 will count in binary steps (0-2-4-8 16-32-etc.) on each negative transition of the clock pulse. The counter U200 is reset every 500ms by $\phi 1$ clock pulses. This forces the counter back to zero every 500ms and it must start counting again to the maximum count. In FIG. 3, one line in the matrix DO is designated M for Manual where the manual speed is programmed. The upshift lines are designated "2 up" for the 2 to 3 upshift point, "3 up" for the 3 to 4 upshift point "4 up" for the 4 to 5 upshift point, and "5 up" for the 5 to 6 upshift point. The downshift lines are designated "4 dn" for the 4 to 3 downshift line and "3 dn" for the 3 to 2 downshift line with the rest of the lines "5 dn" and "6 dn" using the same method of designation. In FIG. 3, the lines in the matrix DO that run perpendicular to the shift lines are the speed lines which run from 2pps up to 4096pps.

As mentioned before, pairs of split terminals are provided to program a speed. Since normally the shift speed will not equal any one particular speed on the matrix, a group of speeds will be added together with their sum equal to the shift speed. Referring to FIG. 3 as an example, the 2 to 3 shift point is to be 300pps. Then jumper wires would be soldered at the following points; 256pps + 32pps + 8pps + 4pps = 300pps, on the "2 up" line.

MANUAL SHIFTING

The manual speed range is controlled by the integrated circuit devices U203A and U203B, and the gates U204A, U204C, and U204C, and U204D (refer to FIG. 4). By placing diodes on the 32pps, 32pps, and 4pps lines, a manual speed of 100pps is programmed in the matrix DO (FIG. 3). As long as the speed is below 100pps, pin 6 of device U203A will remain low, whereas if the speed is 100pps or greater, matrix DO will output a high pulse to device U203A pin 6, causing the output at pin 1 to go high. This output at pin 1 is connected to the input of device U203B at pin 9. When the signal in line $\phi 1$ goes high, whatever condition exists at pin 9 of device U203B will be presented at the output on pin 13 and the inverse condition will be output on pin 12. When the signal on line $\phi 1$ goes low the states of the outputs will hold, unchanging until the signal on line $\phi 1$ again goes high. The signal on line $\phi 2$ causes pin 1 of device U203A to return low if it has gone high. The overall operation is such that device U203A monitors the speed matrix to determine if the vehicle speed is above or below the programmed speed. Device U203B passes the information to the following circuits during the presence of a signal on line $\phi 1$, the sampling interval. The signal on line $\phi 2$ resets the circuit for the next measuring interval.

Pin 2 of gate U204A goes to the second gear output command, namely, pin 2 of integrated circuit counter device U100. Since pin 1 of gate U204A is high and the controller EC must command gear 2 before going into the manual gears, pin 2 of U204A will go high making pin 3 of gate U204A low to pin 13 of gate U204D. Pin 8 of gate U204C goes to the gear selector input line $\overline{AGR}$ for the gear ranges 2-6 (automatic gear ranges). Pin 8 of gate U204C will be high due to pull-up resistor R127 since a manual gear is being selected. With pin 8 of gate U204C high then, when pin 13 of gate U204D goes low, the gates U204D and U204C flip-flop, manual range latch MRL will be set high and pin 11 of gate U204D will go high to pin 1 of gate U104A. Since pin 2 of gate U104A is high from the $\overline{IPO}$ circuit, the high from the $\overline{MRL}$ will cause gate U104A pin 3 to go low. This low is applied to gates U111A through U111C (FIG. 6) allowing the manual gear selected to be engaged. The line MRL is locked high until the $\overline{AGR}$ line goes low, signaling that a gear in the automatic range was selected, and vehicle speed goes above 100pps. Under these circumstances the IPO circuit is on, the manual range latch MRL is latched and the automatic gear range is Not.

When shifting out of the manual range or operating in the automatic range, the following will happen. When the shift lever ERS is moved into the $\overline{AGR}$ mode, the $\overline{AGR}$ line will go low to pin 8 of gate U204C. This will make the MRL reset, but if the vehicle is still traveling under 100pps, second gear will be selected placing a high at pin 2 of gate U204A making pin 3 of gate U204A low allowing the MRL to remain in a high state.

When the vehicle speed is 100pps or above, pin 6 of gate U203A goes high indicating that the speed programmed on the manual speed range has been reached. When pin 6 of gate U203A goes high, pin 1 of gate U203A will go high to pin 9 of gate U203B. When pin 9 goes high, pin 12 of gate U203B will go low to pin 1 of gate U204A. As pin 1 goes low then pin 3 of gate U204A will go high to pin 13 of gate U204D. The high at pin 13 of gate U204D will allow pin 11 of gate U204D to go low. This low goes to pin 1 of gate U104A making pin 3 of gate U104A high. This high goes to gates U111A through U111C (FIG. 6) inhibiting any manual gear from being commanded.

Figure 6:
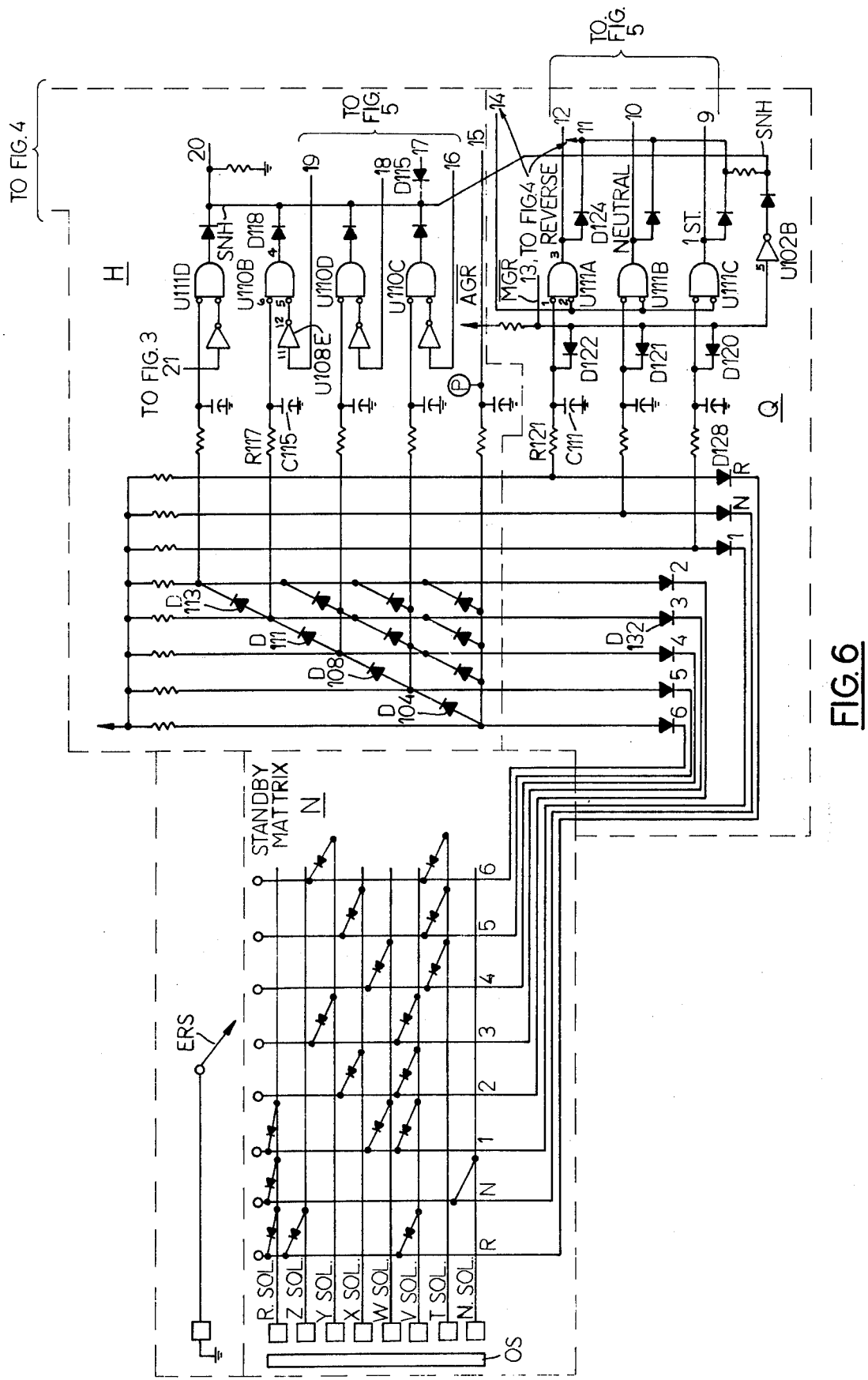

To explain how a manual gear is commanded, an example using reverse gear will now be presented. When the selector ERS is moved to reverse position, a low is applied to this line through diode D128 (FIG. 6). This low will go to pin 1 of gate U111A through the RC network of resistor R121 and capacitor C111 (FIG. 6), this network being used to prevent any noise transients from reaching the gate. This low also goes to pin 5 of gate U102B via diode D122 which will put a high on the SNH line which is explained elsewhere. Since the vehicle speed is 100pps the MRL is high to gate U104A which will make pin 2 of gate U111A low as explained previously. With pin 1 of gate U111A low then pin 3 of gate U111A will go high. This high goes to transistor Q110 turning it "ON". Under these circumstances, the automatic gear range is Not, the manual range latch MRL is latched, and a "shift no higher" condition exists. The high from pin 3 of gate U111A also goes to pin 1 of gate U101 via diode D124 and to pin 11 of gate U100 via diodes D124 and D100. The high on pin 1 of gate U101 will made pin 6 low, pin 11 high, and pin 14 low of gate U101, indicating the binary number two, regardless of any other inputs received. With transistor Q110 "ON" it will then turn "ON" the Darlington transistor Q102. This will pull the reverse gear line low. This line goes to matrix CM (FIG. 5) and by placing diodes, as shown on this line, the appropriate solenoids can be energized to engage reverse. The high on pin 11 of gate U100, combined with the other highs and lows received from gate U101, will cause it to decode an output not used for an automatic gear, thereby locking out the automatic gears 2 through 6 from being commanded.

Automatic Downshifting

Referring to FIG. 3, for downshifting the counter circuit D is used to count the incoming speed pulses from pickup A on the vehicle. A pulse is then generated to the second counter I (FIG. 4) which will count down one step. The decoder J then decodes the number and commands the proper gear.

Suppose a downshift from fourth gear to third gear is required at 350pps. The 4DN line in the speed matrix F would be programmed with diodes to obtain a count of 350pps from the counter device U200. When the count of 350pps is reached, the 4DN line will go high to pin 13 of gate U202D. Since the controller EC is presently commanding gear 4, pin 14 of gate U202D will be high also. These two highs will cause pin 11 of gate U202D to go low to pin 6 of gate U103B. This low will toggle the downshift flip-flop making pin 10 of gate U103C high to pin 13 of gate U104D providing that signal $\phi 2$ is high to pin 9 of gate U103C. When signal $\phi 1A$ pulses high to pin 12 of gate U104D, pin 11 will pulse low to pin 9 of gate U107C. Pin 8 of gate U107C will be low indicating that gear 2 is not commanded, thereby allowing pin 10 of gate U107C to pulse high. This high pulse then goes to pin 5 of gate U204B and with pin 6 high, pin 4 of gate U204B will pulse low. This low pulse will go to 10 of gate U101 which will make the counter device U101 count down to its next state. The low pulse at pin 4 of gate U204B also goes to pin 5 of gate U104B making pin 4 of gate U104B pulse high. This high pulse will cause the counted device U101 to count down one state to the binary number three. The outputs of device U101 will then be, pin 11 high, and pin 14 low. These outputs then go directly to pins 10, 13, and 12 of device U100. Device U100 will decode the incoming binary number three and make pin 15 high which is the decimal number three.

The high on pin 15 of device U100 goes to transistor Q114 turning it "ON" which will then turn "ON" Darlington transistor Q104. Transistor Q104 will pull the third gear line low, energizing the appropriate solenoid (5) through the controller matrix K. The high from pin 15 of device U100 also goes to pin 8 of gate U202C. This will ready gate U202C to make the downshift from third-to-second. With pin 15 of device U100 going high that means pin 1 of device U100, commands fourth gear, went low, making pin 12 of gate U202D low removing the low on the downshift line of gate U103B signaling the flip-flop that there is no downshift to be made, until the next downshift speed is reached. A clock pulse signal $\phi 2$ is used to reset the downshift flip-flop every 500ms. The $\phi A$ pulse signal is the actual shift pulse and is timed to pulse high every 500ms giving the delay necessary between shifts. To prevent any downshifting past second gear, gate U107C is used. Any time second gear is commanded, pin 8 of gate U107C is high thus inhibiting any downshift commands to gate U101. It should be remembered that at this point any count further down would put gate U101 in an undefined state. Gate U204B is used to prevent any downshift commands while the shift selector ERS is in an undefined state such as between the selection of two gears. When it is time for the third-to-second downshift the entire sequence will repeat itself.

Automatic Upshifting

The controller EC counts the speed pulses generated by the speed sensor A and upon reaching the programmed shift point pulses the second counter 1 to count up one state. The new state is decoded and the gear is commanded. The controller EC also checks to make sure there will not be a shift past the selected gear, that the accelerator pedal is depressed to close switch TPS and the selector ERS is in a defined position.

To explain how an upshift occurs an example will be used explaining a shift from second to third gear at 300pps. The shift selector ERS will be placed in the sixth gear position with the gear shift mechanism P in second gear.

Since the gear shift mechanism P is already in second gear, pin 2 of device U100 is high making pin 12 of gate U201D high. As the vehicle speed increases, device U200 will count the incoming pulses. When the vehicle speed reaches 300pps, the "3up" line will go high to pin 13 of gate U201D. This will make pin 11 of gate U201D low to pin 1 of gate U103A through diode D203. This low will cause the upshift flip-flop to toggle and made pin 11 of gate U103D low providing that signal $\phi 2$ is high on pin 13 of gate U103D. Pin 13 of gate U103D is connected to receive the signal $\phi 2$ from the clock which pulses low every 500ms resetting the upshift flip-flop, pin 1 high, until pin 1 of gate U103A goes low again. The low at pin 11 of gate U103D goes to pin 12 of gate U107D. When pin 13 of gate U107D pulses low, meaning that it is permissible to upshift, as hereinafter explained, pin 11 of gate U107D will pulse high to pin 3 of gate U102A. This high will make pin 2 of gate U102A pulse low to pin 6 of gate U104B. Pin 4 of gate U104B will then pulse high to pin 15 of device U101, which is the clock input, and will cause the counter U101 to count up one state since there is a high present on pin 10 of counter U101. Counter U101 will then count from the binary number two to the binary number three which would give the following outputs;

pin 6 high, pin 11 high, and pin 14 low. These outputs go directly to the inputs of device U100. Device U100 will decode the inputs to the number three and make pin 2 low and pin 15 high. This high goes to transistor Q114 turning it "ON" which then goes to Darlington transistor Q104 turning it "ON" also. A low is then applied to the third gear line to the controller matrix G and will energize the solenoid programmed by the diodes. The high on pin 15 of device U100 also goes to pin 8 of gate U201C which waits for the programmed speed for the third to fourth gear upshift to occur. Upshifting will continue to happen as described until the gear selected is reached.

The decision not to shift to the next higher gear is made by gates U110B through U111D. For an example, assume that third gear is the highest gear selected. The selector ERS would then apply a low via diode D132 to pin 6 of gate U110B. Resistor R117 and capacitor C115 are used to provide filtering. As gear 3 is commanded pin 11 of gate U108E goes high making pin 12 low to pin 5 of gate U110B. Then pin 4 will go high to the $\overline{SNH}$ line via diode D118. The $\overline{SNH}$ line goes to pin 1 of gate U110A and when pin 1 goes high pin 3 of gate U110A will go low to pin 8 of gate U102C inhibiting the $\phi 1A$ pulse from reaching gate U107D and thereby preventing an upshift. If the operator were to move the shift selector ERS to the second gear position the controller EC would still command third and hold it there because diode D113 would put the low back to pin 6 of U110B. As the arrangement of diodes D104-D113 makes clear, the operator is free to move the shift selector to any other gear and the controller EC will still command the gear it presently was in the shift no higher. If a manual gear is selected diodes D120 through D122 would place directly to the $\overline{SNH}$ line through inverter U102B. To prevent upshifting past sixth gear, pin 7 of device U100 is connected directly to the $\overline{SNH}$ line through diode D115.

To prevent the transmission from upshifting while coasting down a hill, the on-off throttle switch TPS is used to indicate when the operator wants to accelerate and when he removes his foot from the throttle, which may be the case as when coasting down a hill. When the throttle is depressed for acceleration and switch TPS is closed, a low is applied by the switch through terminal T104. This low goes to pin 2 of gate U110A and with the $\overline{SNH}$ line low, pin 3 of gate U110A will go high to pin 8 of U104C. With pin 8 high $\phi 1A$ pulses are allowed to pass, allowing an upshift. If however the throttle is released the switch TPS will open putting a high on pin 2 of gate U110A. This will make pin 3 of gate U110A low to pin 8 of gate U104C, inhibiting $\phi 1A$ pulsing and therefore inhibiting any upshift.

If the shift selector ERS is placed in an undefined position, then $\phi 1A$ pulses will not be generated to pin 9 of gate U104C and an upshift will not be allowed.

A transmission in accordance with the present invention is capable of the following functions, among others:

Normal Upshifting Mode: During automatic operation in ranges two through six, placement of the range selector ERS in any given shift range position initiates automatic shifting of gear shift mechanism P is converter drive up to the selected shift range. A shift to lock-up is then allowed by lockup valve LU; being triggered from the turbine speed sensor PM. Automatic downshifting from given shift ranges through converter ranges is allowed down to the lowest gear in the automatic range, i.e., second gear, for example. With range selector ERS in neutral position, no shifting is allowed with one exception; with any clutch engaged and range selector ERS then put into neutral position, downshifting occurs but neutral is not attained until output speed drops below the manual speed range setting. Neutral cannot be attained unless the range selector ERS is in neutral position.

Adjustable Speed Control: The correct speed signal for automatic shifting from one range to another is predetermined at the factory according to transmission usage, and is determined by the positioning of the diodes in the matrix DO within the electronic control EC. This speed is chosen on the basis of full throttle engine operation.

Lock-up Clutch Control (hydraulic): The shift converter range to lock-up range is achieved through hydraulic lock-up valve LU which senses turbine speed through pitot device PM. The speed at which the lock-up comes in and out is set by adjustments on a hydraulic valve in valve LU.

Downshift control: Operator movement of shift range selector ERS at any time to a lower gear allows a lower gear downshift only when the correct speed is achieved by the transmission output shaft SH. The direct drive or lock-up clutch LC will be disconnected by the flow sensing device PM when the transmission actually downshifts. These downshift speeds are factory determined and adjusted on the bases of full throttle engine operation.

Inhibition of vehicle reversal with transmission: The control EC does not allow vehicle direction reversals to be made at any speed above approximately one-fourth MPH while operating in the automatic range. However, in the manual range, direction reversal can be made at any speed. This eliminates shifts from forward to reverse at high vehicle speeds during automatic shifting which are generally injurious to clutches. A lever movement of selector ERS from forward to reverse at speeds above the inhibit speeds during automatic operation prevents any transmission action until the inhibit speed is reached because of the action of the electronic digital logic.

Unwanted Neutral shifts: The transmission does not shift to neutral regardless of any series of selector lever movement, except when moved to the neutral position by means of the selector ERS and attainment of the inhibit speeds.

Failure of Speed Pickup Sensor; If the system is operating at some shift range in the automatic range and an open circuit condition arises in the output speed pickup circuit A, the logic system will automatically cause downshifting to the second gear from whatever gear range the system was in at the time of the occurrence of the open circuit. However, if a ground occurs in the output speed pickup circuit A, the logic circuit becomes inoperative and the mechanical means in the gear shift mechanism P comes into play to maintain the system in that gear range in which the system was at the time that the ground fault occurred.

Override Feature: Override connector means OS (see FIGS. 2 and 6) are connectable to the controller EC by the operator, to eliminate all automaticity from the control EC and make it strictly a direct manual control device for all gear ranges. Thus, the operator can shift to any gear at any time in any condition using the shift mechanism P as a device to stop, reverse, retard or accelerate the vehicle in any usual fashion.

Throttle Position Control: Throttle position switch TPS signals to the control EC the position of the engine throttle (off at idle — on at any other speed). If a signal is present, an up or downshift is permitted. If no signal is present, only a downshift is permitted.

In the drawings, for example, all diodes are type IN4148 unless otherwise stated; all Nand gates are type CD4011 packages; all Nor gates are type CD4001 packages; all inverters are type CD4049 packages; and all LEDs are type MV5054-3 devices.

We claim:

1. In combination:
 a prime mover;
 accelerator means operable to regulate the speed of said prime mover;
 a gear shift mechanism driven by said prime mover and shiftable in a manual gear range including neutral and reverse and shiftable in an automatic gear range including a plurality of speed ranges above neutral;
 electrically actuatable devices for shifting said mechanism into any gear of said manual and automatic gear ranges;
 a range selector switch selectively movable to any one of a plurality of gear range positions and for providing an electrical range signal indicative of the gear range position selected;
 speed sensing means for providing an electrical speed signal indicative of the output speed of said mechanism, said speed sensing means providing a pulsed electrical speed signal whose frequency is indicative of the output speed of said mechanism;
 means for providing an electrical acceleration signal indicative of whether said accelerator means is being operated or not to effect regulation of the speed of said prime mover;
 and electronic digital control means to provide control signals for actuating said devices, said control means including a signal pattern recognition circuit having an upshift section and a downshift section: said control means effecting operation of said mechanism in any gear in said manual gear range solely in response to said range signal;
 said control means effecting upshift operation of said mechanism to any gear in said automatic gear range in response to said range signal, said speed signal and an acceleration signal indicative that said prime mover is being accelerated, said acceleration signal indicative that said accelerator means is being operated enabling said upshift section of said signal pattern recognition circuit to effect said upshift operation;
 and said control means effecting downshift operation of said mechanism to any gear in said automatic gear range in response to said range signal, said speed signal, and an acceleration signal indicative that said prime mover is not being accelerated, said acceleration signal indicative that said accelerator is not being operated enabling said downshift section of said signal pattern recognition circuit to effect said downshift operation, said electronic digital control means comprising:
 a counter circuit for receiving said speed signal and for providing a count signal indicative of the output speed of said mechanism:
 said signal pattern recognition circuit being adapted for receiving said count signal and for providing a shift signal based on recognition of a predetermined count signal pattern and corresponding to the speed of said mechanism;
 a shift logic circuit for receiving a shift signal from said signal pattern recognition circuit, said range signal and said acceleration signal, and for providing an upshift or downshift indicative of whether or not the output speed of the mechanism corresponds to the selected gear range and indicative, in the case of an upshift signal, of whether or not the prime mover is being accelerated;
 an up/down counter circuit for receiving said upshift or downshift signal from said shift logic circuit and for providing an output signal indicative of which gear range should be employed;
 and a decoder circuit for receiving said output signal and for providing control signals for operating said devices to effect shifting of said gear shift mechanism.

2. A combination according to claim 1 wherein said gear shift mechanism is shiftable in a manual gear range including neutral, reverse and first gear and is shiftable in an automatic gear range including a plurality of speed ranges above first gear.

3. In combination:
 a prime mover;
 accelerator means operable to regulate the speed of said prime mover;
 a gear shift mechanism driven by said prime mover and shiftable in a manual gear range including neutral and reverse and shiftable in an automatic gear range including a plurality of speed ranges above neutral;
 electrically actuatable devices including solenoid valves for shifting said mechanism into any gear of said manual and automatic gear ranges;
 a manually operable range selector switch selectively movable to any one of a plurality of gear range positions and for providing an electrical range signal indicative of the gear range position selected;
 speed sensing means for providing a pulsed electrical speed signal whose frequency is indicative of the output speed of said mechanism;
 means for providing an on-off electrical acceleration signal indicative of whether said accelerator means is being operated or not to effect regulation of the speed of said prime mover;
 and electronic digital control means to provide control signals for actuating said devices, said control means including a signal pattern recognition circuit having an upshift section and a downshift section: said control means effecting operation of said mechanism in any gear in said manual gear range solely in response to said range signal;
 said control means effecting upshift operation of said mechanism to any gear in said automatic gear range in response to said range signal, said speed signal and an on acceleration signal indicative that said prime mover is being accelerated, said acceleration signal indicative that said accelerator means is being operated enabling said upshift section of said signal pattern recognition circuit to effect said upshift operation;
 and said control means effecting downshift operation of said mechanism to any gear in said automatic gear range in response to said range signal, said speed signal, and an acceleration signal indicative that said prime mover is not being accelerated, said acceleration signal indicative that said accelerator is not being operated enabling said downshift section of said signal pattern recognition circuit to effect said downshift operation;

said control means comprising:

a counter circuit for receiving said speed signal and for providing a count signal indicative of the output speed of said mechanism;

said signal pattern recognition circuit including a diode matrix for receiving said count signal and for providing a shift signal based on recognition of a predetermined count signal pattern and corresponding to the speed of said mechanism;

a shift logic circuit for receiving a shift signal from said signal pattern recognition circuit, said range signal and said acceleration signal, and for providing an upshift or downshift signal indicative of whether or not the output speed of the mechanism corresponds to the selected gear range and indicative, in the case of an upshift signal, of whether or not the prime mover is being accelerated; and up/down counter circuit for receiving said upshift or downshift signal from said shift logic circuit and for providing an output signal indicative of which gear range should be employed;

and a decoder circuit for receiving said output signal and for providing control signals for operating said devices to effect shifting of said gear shift mechanism.

4. A combination according to claim 3 wherein said gear shift mechanism is shiftable in a manual gear range including neutral, reverse and first gear and is shiftable in an automatic gear range including a plurality of speed ranges above first gear.

* * * * *